United States Patent [19]

Tanaka

[11] 4,258,390
[45] Mar. 24, 1981

[54] VIDEO SIGNAL PROCESSING CIRCUIT
[75] Inventor: Hideshi Tanaka, Yokohama, Japan
[73] Assignee: Victor Company of Japan, Ltd., Yokohama, Japan
[21] Appl. No.: 934,487
[22] Filed: Aug. 17, 1978
[30] Foreign Application Priority Data Aug. 19, 1977 [JP] Japan ................................. 52/99342

[51] Int. Cl.³ ............................................. H04N 5/14
[52] U.S. Cl. ...................................... 358/160; 358/141
[58] Field of Search ................................ 358/160, 141

[56] References Cited
U.S. PATENT DOCUMENTS

| | | | |
|---|---|---|---|
| 3,842,200 | 10/1974 | Dolch .................................... | 358/160 |
| 3,911,212 | 10/1975 | Yoshizawa et al. .................. | 358/160 |
| 4,130,835 | 12/1978 | Guildford ........................... | 358/160 |

Primary Examiner—Richard Murray
Attorney, Agent, or Firm—Haseltine and Lake

[57] ABSTRACT

A video signal processing circuit in which sampling hold circuits are responsive to respective sampling pulses supplied simultaneously for sampling common input video signals and for holding values thus sampled until succeeding sampling pulses are introduced. A sampling pulse generation circuit supplies a plurality of sampling pulse trains, respectively, having pulses of a pulse width $\tau$ and a period T. These pulses of respective pulse trains are not overlapped mutually on a time axis. A circuit derives as output thereof maximum or minimum levels of outputs of the sampling hold circuits or for adding outputs of the sampling hold circuits and for producing an added signal as output.

11 Claims, 15 Drawing Figures

VIDEO SIGNAL PROCESSING CIRCUIT

BACKGROUND OF THE INVENTION

This invention relates generally to circuits for processing video signals, and more particularly to a circuit capable of operating positively detection of the maximum (or minimum) value of a video signal from a video signal generating apparatus such as a television camera, and low-pass filtration of the video signal.

In general, there are circuits of a type in which a number of pores in a picture image of the sea bottom on the reproduced television picture picked up by television camera is counted in an electronic manner. In this circuit, upon counting, the video signals of the object picked up by the television camera, is subjected to conversion into binary-coded signals.

In the circuit known, heretofore, for converting and processing the video signal into the binary-coded signal, it is difficult to set a clipping level (or slicing level) of a clipper (or slicer), because the mean value of the signal fluctuates in accordance with information contents of the video signals. Therefore, there arises a difficulty in which the signal conversion and processing into binary-coded signal can not be carried out correctly and effectively.

Moreover, in the case of attempting to obtain picture screen of faded picture, it has been a practice to eliminate high-frequency components of the video signal by passing it through a low-pass filter. However, since the low-pass filter known, heretofore, is composed of a resistor and a capacitor, when square-wave signals are passed through this low-pass filter, for example, the rising characteristic and falling characteristic become out of symmetry, which leads to deterioration of picture quality of the television picture.

SUMMARY OF THE INVENTION

Accordingly, it is a general object of the present invention to provide a novel and useful video signal processing circuit in which the above described difficulties have been overcome.

Another and specific object of the present invention is to provide a video signal processing circuit which detects the maximum or minimum value of the video signal. In the case where the circuit of the present invention is applied to a circuit for converting and processing into the binary-coded signal, the video signal can be always converted into binary-coded signals correctly and effectively, irrespective of any information contents of video signal, that is, irrespective of mean value of the signal.

Still another object of the present invention is to provide a video signal processing circuit which is capable of operating as low-pass filter for eliminating higher frequency components of the video signal, without deteriorating symmetry of signal rising characteristic and falling characteristic.

A further object of the present invention is to provide a signal processing circuit which, in the case of being applied to a binary-coded signal conversion and processing circuit, is adapted not to allow disappearance of level of the television video signal in its blanking period. According to the circuit of the present invention, DC restoration of the signal thus converted can be carried out correctly.

Further objects and features of the present invention will become apparent from the following detailed description with respect to preferred embodiments of the invention, when read in conjunction with the accompanying drawings.

BRIEF DESCRIPTION OF THE DRAWINGS

In the drawings:

FIG. 7(A) through FIG. 7(J) are diagrams respectively showing waveforms of signals appearing at various parts in the block diagram illustrated in FIG. 5;

FIG. 10(A) through FIG. 10(K) are diagrams respectively showing waveforms of the signals appearing at various parts in the block diagram illustrated in FIG. 9;

DETAILED DESCRIPTION

Figure 1:
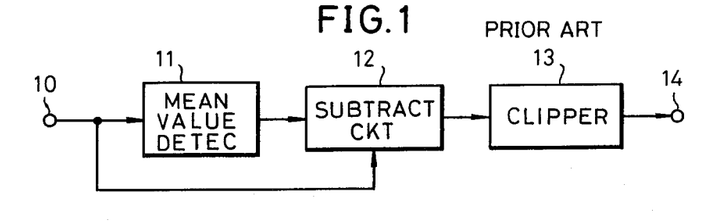
FIG. 1 is a schematic block diagram of one example of a conventional circuit for converting video signal into binary-coded signal.
Figure 2:
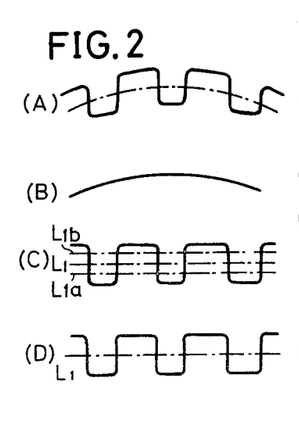
FIGS. 2(A) through 2(D), FIGS. 3(A) through 3(D), and FIGS. 4(A) through 4(D) are charts, respectively, showing waveforms of signals corresponding to information contents of video signal.
Figure 3:
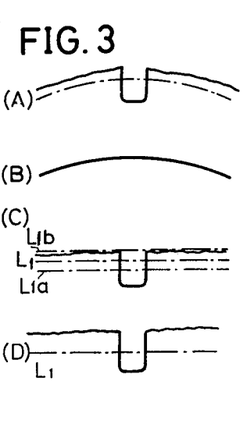
Figure 4:
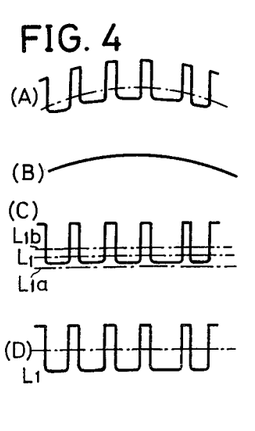

For clarifying difficulties of a conventional binary-coded signal conversion and processing circuit known, heretofore, the structural organization and operation of this apparatus will first be described. Referring to FIG. 1, a video signal from a signal source such as a television camera is introduced through an input terminal 10 and is supplied to a mean value detection circuit 11 and a subtraction circuit 12. The mean value detection circuit 11 is adapted to detect a mean value of an input video signal indicated in FIGS. 2(A), 3(A) or 4(A), for example, and to output a mean value signal indicated in FIGS. 2(B), 3(B) or 4(B). This mean value signal is supplied to the subtraction circuit 12, where it is subtracted from the video signal supplied from the input terminal 10, and a signal of waveform illustrated in FIGS. 2(C), 3(C), or 4(C) is taken out therefrom. According to subtraction of the video signal and the mean value thereof in the subtraction circuit 12, a signal of lower frequency component which undergoes level fluctuation (shading variation in television picture) over the entire video signal as indicated in FIGS. 2(A), 3(A) or 4(A) is eliminated, and a signal of higher frequency components having only light-dark information contents to be counted is derived. The output signal thus derived is supplied to a clipper (or slicer) 13, where it is clipped (or sliced) at a predetermined level $L_1$. Accordingly, the binary-coded signals converted from the input video signal are led out through an output terminal 14.

Therefore, according to this conventional circuit, the mean value level undergoes fluctuation in response to light-dark information contents to be counted of the video signal, whereby clipping operation of the clipper 13 becomes unstable inevitably. Specifically, when the clipping level has been set at a level $L_{1a}$ for the signal as indicated in FIG. 3(C), the signal indicated in FIG. 4(C) cannot be clipped effectively. Conversely, when the clip level has been set at a level $L_{1a}$ for the signal as indicated in FIG. 4(C), the signal indicated in FIG. 3(C) cannot be clipped effectively. As set forth, the conventional circuit has been accompanied by difficulties in that signal conversion and processing into binary-coded signal cannot be carried out effectively for all the input video signals of information contents, and that presetting of the level $L_1$ is extremely difficult.

Figure 5:
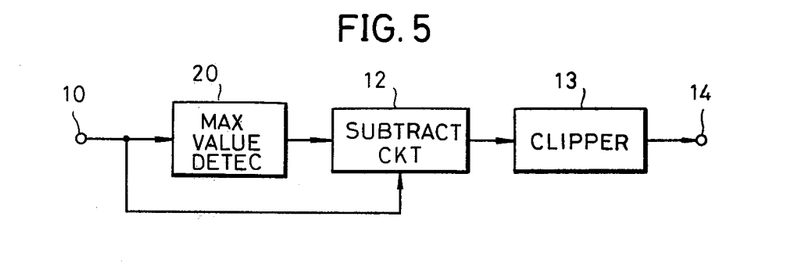
FIG. 5 is a schematic block diagram showing one embodiment of an instance where a video signal processing circuit according to the present invention is applied to a binary-coded signal conversion and processing circuit.

Accordingly, one of the objects of the present invention is to provide a novel video signal processing circuit in which the above described difficulties have been overcome. A block diagram of one embodiment of the present invention is indicated in FIG. 5, in which parts which are the same as corresponding parts in FIG. 1 are designated by like reference numerals.

The video signals applied to the input terminal 10 are supplied to a maximum value detection circuit 20 constituting one embodiment of a video signal processing circuit of the present invention, and to the subtraction circuit 12. The maximum value detection circuit 20 is adapted to detect the maximum value of the input video signal. The signal thus detected is supplied to the subtraction circuit 12, where it is subtracted from the input video signal from the input terminal 10. Since the video signal is subjected to subtraction by the maximum value signal thus detected, the output signal of the subtraction circuit 12 becomes as indicated in FIGS. 2(D), 3(D) or 4(D), in which components of lower frequency fluctuation are eliminated and furthermore, the maximum values thereof are arranged in the same value. Accordingly, the signals of the all signal contents indicated in FIGS. 2(D), 3(D), and 4(D) are clipped correctly and effectively by the level $L_1$ preset in the clipper 13.

Figure 6:
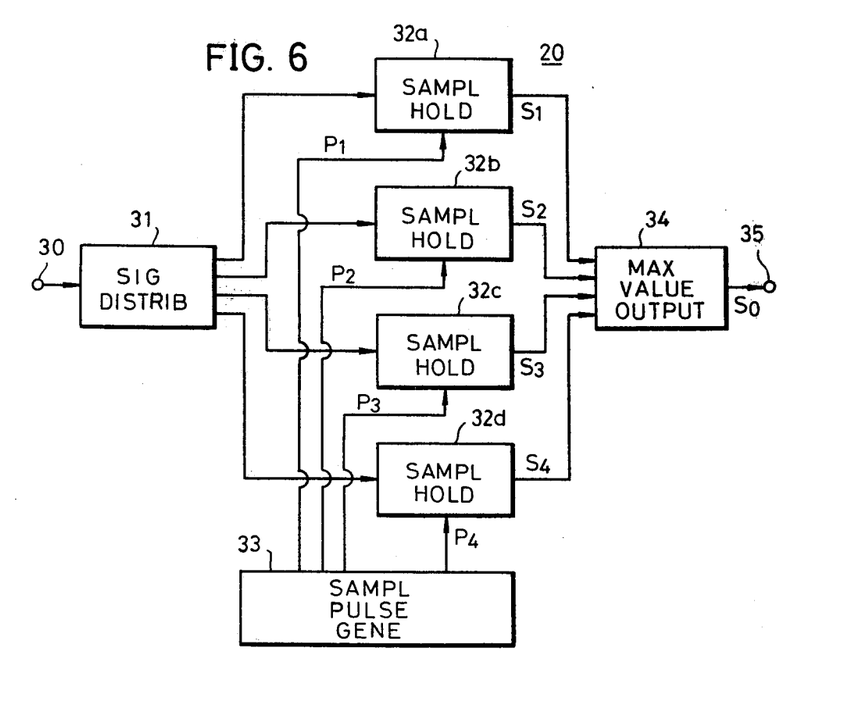
FIG. 6 is a schematic block diagram showing a first embodiment of a video signal processing circuit according to the present invention.
Figure 7:
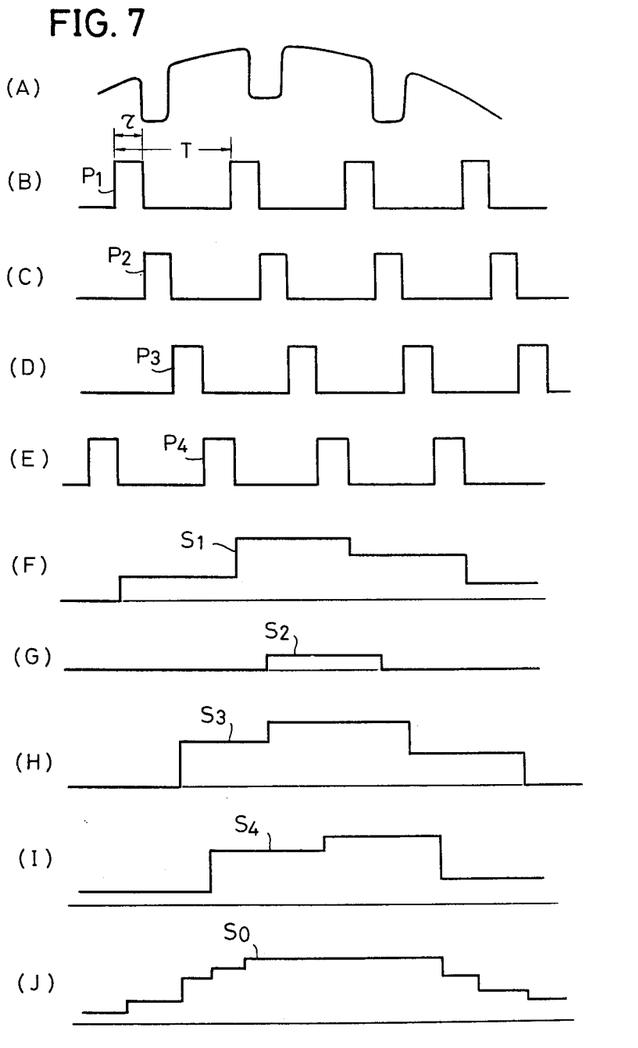

Next, a description is given of a first embodiment of the aforementioned maximum value detection circuit 20, in conjunction with FIG. 6. An input video signal having a waveform as indicated in FIG. 7(A) and introduced through an input terminal 30 is supplied to a signal distributor 31, where it is distributed to sampling hold circuits 32a, 32b, 32c, and 32d. In the present embodiment, four sampling hold circuits are provided, but any numbers N (N≧2) of sampling hold circuits may be provided.

On the other hand, a sampling pulse generator 33 generates sampling pulses $P_1$ through $P_4$ indicated in FIGS. 7(B), 7(C), 7(D) and 7(E), which are respectively supplied to sampling hold circuits 32a through 32d. These sampling pulses $P_1$ through $P_4$, respectively, have pulse width $\tau$ and period T, and show a time sequence wherein the pulses succeed without overlapping mutually on the time axis. Specifically, in the present embodiment, the pulse width $\tau$ is determined such that $$\tau = T/N,$$

where N denotes a number of sampling hold circuits. N is four in the present embodiment. Alternatively, the pulse width $\tau$ may be such that $\tau < T/N$. Here, the pulse width $\tau$ is required to be wide to some extent so that no unrequired signals is sampled among the video signals to be subjected to sampling.

The sampling hold circuits 32a through 32d are respectively adapted to sample the video signals from the signal distributor 31 by the sampling pulses $P_1$ through $P_4$ supplied thereto, and to hold the level thus sampled until the succeeding sampling pulse appears. Accordingly, the signals $S_1$ through $S_4$ of waveforms indicated in FIG. 7(F) through FIG. 7(I) are respectively derived from the sampling hold circuits 32a through 32d.

The output signals $S_1$ through $S_4$ of the sampling hold circuits 32a through 32d are respectively supplied to a maximum value output circuit 34 constituting of, for instance, diodes connected in a wired-OR connection. Accordingly, from the maximum value output circuit 34, is derived a signal $S_0$ having the maximum level among the signals $S_1$ through $S_4$, as indicated in FIG. 7(J). The output maximum value signal $S_0$ is taken out from an output terminal 35, and is then supplied to the subtraction circuit 12 where the subtraction of the input video signal and the output maximum value signal is carried out.

The output signal $S_0$ of the maximum value detection circuit 20 substantially shows an envelope of the maximum value of the input video signal. Therefore, when the output signal of the subtraction circuit 12 is clipped by the clipping level $L_1$ preset in the clipper 13, the video signal is clipped at a predetermined clipping level $L_1$ with reference to the maximum value, with the maximum values thereof always being arranged at the same value, as indicated in FIGS. 2(D), 3(D), and 4(D). Consequently, irrespective of information contents of the video signals, clipping is always carried out correctly and effectively, and signal processing for converting into the binary-coded signal can be carried out correctly.

It is to be noted that, a period T of the sampling pulse is determined larger than the maximum pulse widths Ts of the pulsive output binary-coded signals. For instance, the period T is determined so as to satisfy following relationship, $2Ts - 3Ts > T > Ts$.

Alternatively, in the case of using an adder instead of the maximum value output circuit 34, a signal in which all the signals $S_1$ through $S_4$ are added together is led out through the output terminal 35. The output signal thus added is a signal in which higher frequency components of the input video signal have been eliminated. Accordingly, in this case, the maximum value detection circuit 20 operates as a low-pass filter.

Figures 8A, 8B:
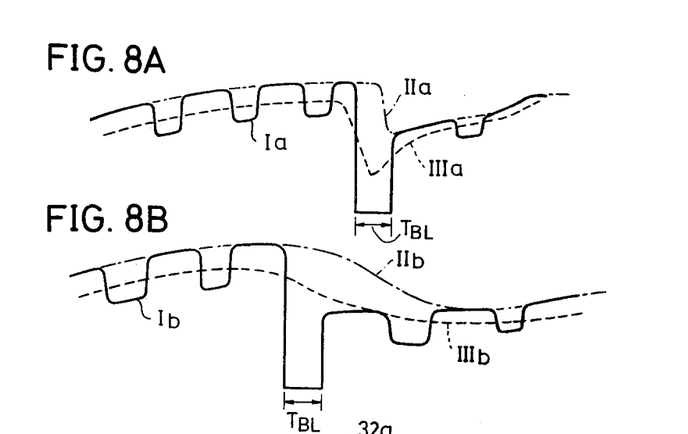
FIG. 8A and FIG. 8B are signal waveform diagrams for a description of problems involved in the embodiment illustrated in FIG. 6.

Then, when taking a note of blanking period of a television video signal, the waveforms of a vertical blanking period ($T_{BL}$) and video information signal portions adjacent thereof are indicated, for example, by curves Ia and Ib in FIGS. 8A and 8B. When this video signal is passed through the maximum value detection circuit 20 of the embodiment indicated in FIG. 6, the output signal of this circuit 20 becomes as indicated by curves IIa and IIb of single-dot chain lines, in FIGS. 8A and 8B. Alternatively, in the case where this video signal is passed through the aforementioned low-pass filter instead of the maximum value detection circuit, the output signals of the low-pass filter assume curves IIIa and IIIb of broken lines. It is noted from these curves IIa, IIb, IIIa, IIIb that sampling hold operation of the sampling hold circuit 32a through 32d is carried out also in the blanking period. FIG. 8B shows waveform diagram in an instance where the period T of sampling pulse is longer than the blanking period $T_{BL}$.

As apparent from FIGS. 8A and 8B, when the video signal is passed through the maximum value detection circuit of the present invention, there arises a problem in that the black level in the blanking period $T_{BL}$ disappears, which leads to incapability of carrying out DC restoration of output signal.

Figure 9:
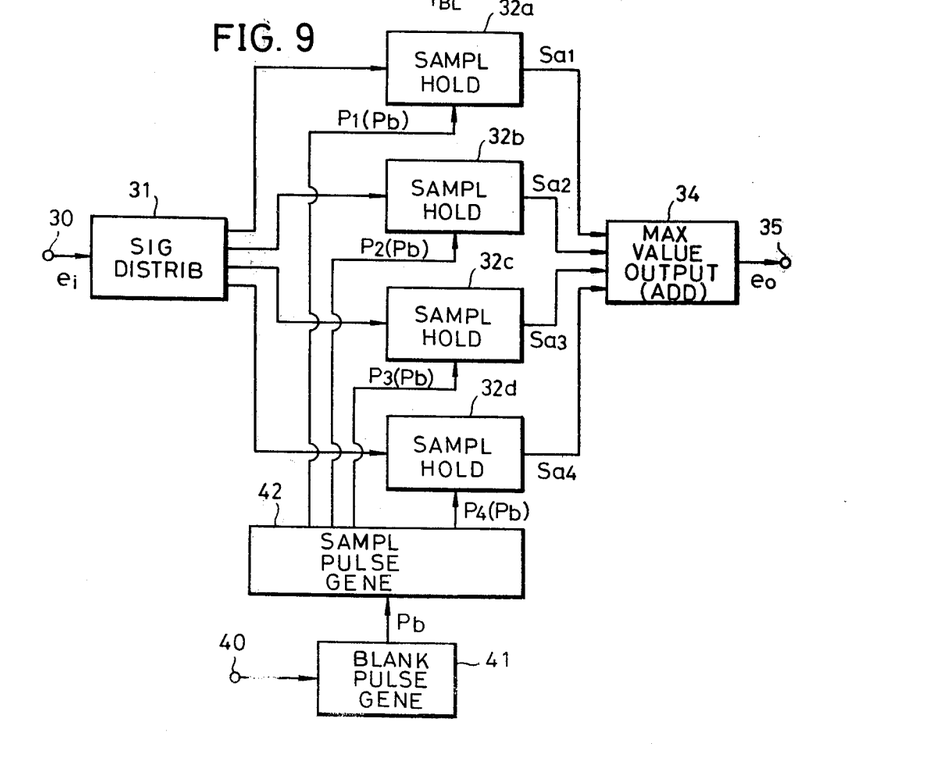
FIG. 9 is a block schematic diagram showing a second embodiment of a video signal processing circuit of the present invention.

Next, a description is given of a second embodiment of the circuit of the present invention wherein the above described problems involved in the first embodiment have been solved, in conjunction with FIG. 9. In FIG. 9, the same reference numerals designate the same parts in FIG. 6, and description thereof is omitted.

Figure 10:
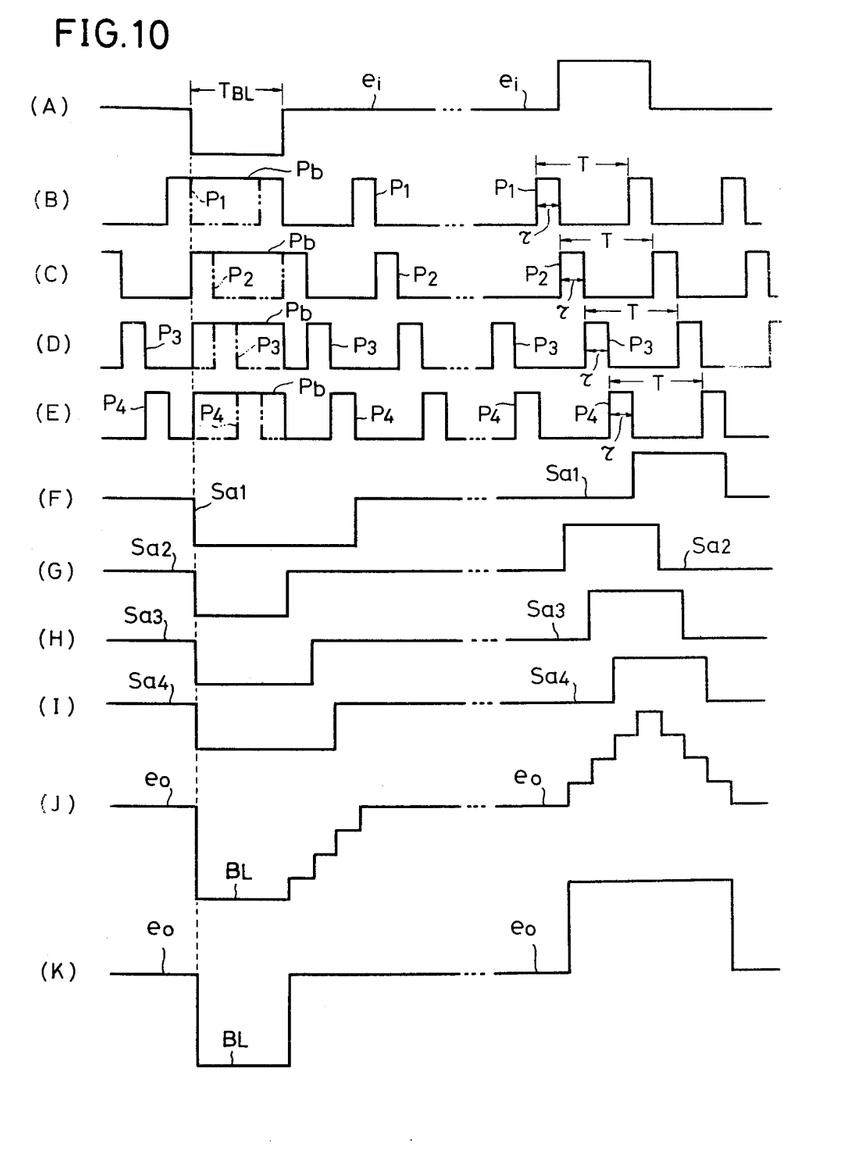

An input video signal $e_i$ having a horizontal blanking period $T_{BL}$ as indicated in FIG. 10(A) and introduced through an input terminal 30 is distributed and supplied to sampling hold circuits 32a through 32d by way of a signal distributor 31. On the other hand, a synchronizing signal separated from the input video signal is supplied from an input terminal 40 to a blanking pulse generator 41. A blanking pulse Pb generated from the blanking pulse generator 41 in response to the synchronizing signal is supplied to a sampling pulse generator 42, where it is inserted into the sampling pulses $P_1$ through $P_4$ to be generated from the sampling pulse generator 42. Accordingly, from the sampling pulse generator 42, signals wherein blanking pulses corresponding to blanking period $T_{BL}$ of the video signal are inserted into respective sampling pulses $P_1$ through $P_4$, as indicated in FIGS. 10(B), 10(C), 10(D) and 10(E) are supplied to the sampling hold circuits 32a through 32d. In FIG. 10(B) through FIG. 10(E), waveforms of two-dot chain lines show positions of sampling pulses in the case where no blanking pulse Pb is inserted.

The sampling hold circuits 32a through 32d operate, in response to the sampling pulses $P_1$ through $P_4$ inserted with the aforementioned blanking pulse Pb as indicated in FIG. 10(B) through FIG. 10(E), to sample the video signal indicated in FIG. 10(A) and hold it, and then to output signals $Sa_1$ through $Sa_4$ indicated in FIG. 10(F) through FIG. 10(I). These output signals $Sa_1$ through $Sa_4$ are supplied to the circuit 34.

In the case where the circuit illustrated in FIG. 9 is used as low-pass filter, an adder is used as the circuit 34. In this instance, the signals $Sa_1$ through $Sa_4$ are added together in the adder 34, and the output signal $e_0$ thus added becomes a signal of waveform indicated in FIG. 10(J). Alternatively, in the case where the circuit illustrated in FIG. 9 is used as the maximum value detection circuit for conversion into binary-coded signal, the circuit 34 is arranged as the maximum value output circuit. Accordingly, the maximum levels among these signals $S_1$ through $S_4$ are derived from the circuit in FIG. 9, and the resulted output signal $e_0$ indicated in FIG. 10(K) is derived from the maximum value output circuit 34.

The output signals $e_0$, respectively, have their level parts BL which corresponds to black level in the blanking period of the video signal. For this reason, DC restoration of the output signal converted can be carried out correctly, whereby the above described problems involved in the first embodiment are now solved.

Next, embodiments of concrete electrical circuits of various parts in the block diagram shown in FIG. 9 are described with reference FIG. 11 through FIG. 13.

Figures 11, 12A, 12B:
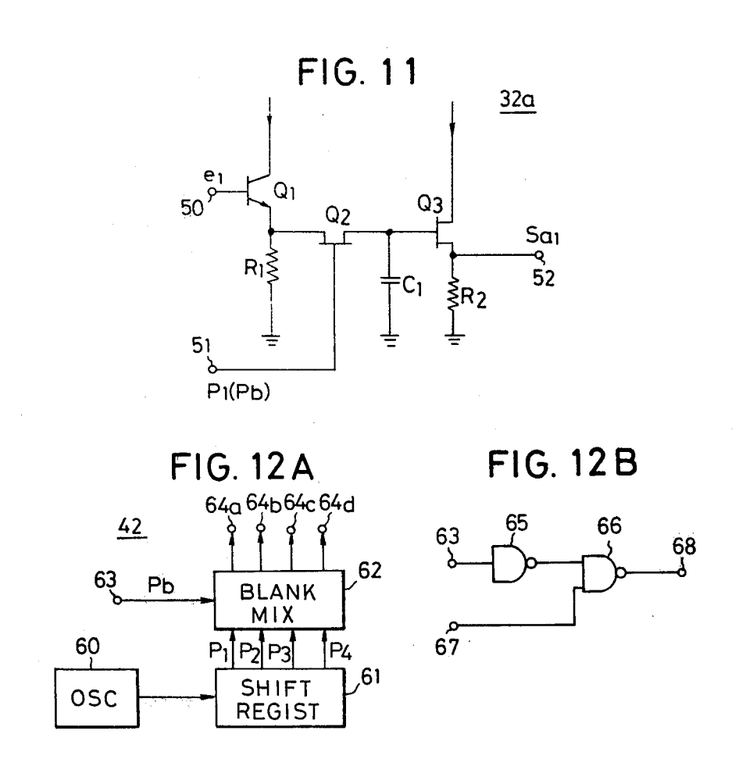
FIG. 11 is a circuit diagram showing one example of a sampling hold circuit.
FIG. 12A is a block diagram showing one embodiment of a sampling pulse generator.
FIG. 12B is a circuit diagram showing a part of the sampling pulse generator illustrated in FIG. 12A.

One embodiment of a circuit organization of the sampling hold circuit 32a is shown in FIG. 11. Ths other circuits 32b, 32c, and 32d have circuit organizations similar to that indicated in FIG. 11. The input video signal $e_i$ from the signal distributor 31 is applied to a terminal 50, and the sampling pulse P1(Pb) from the sampling pulse generator 33 is applied to a terminal 51. A transistor $Q_2$ operates to pass the video signal which has passed through a transistor $Q_1$ therethrough only in a period of time when the sampling pulse is at a high level, thus carrying out sampling operation. The signal which has passed through the transistor $Q_2$ is charged in a capacitor $C_1$, and output $Sa_1$ is obtained from a terminal 52 by way of a transistor $Q_3$. The signal thus sampled is kept in the capacitor $C_1$, until a succeeding high level of the sampling pulse is applied to the terminal 51.

One embodiment of a concrete block diagram of the sampling pulse generator 42 is shown in FIGS. 12A and 12B. Referring to FIG. 12A, a train of reference clock signals from an oscillator 60 is supplied to a shift register 61, where the clock signals are shifted in succession. The output sampling pulse signals $P_1$ through $P_4$ of the shift register 61 are supplied to a blanking mixer 62. On the other hand, a blanking pulse Pb from the blanking pulse generator 41 is supplied through a terminal 63 to the blanking mixer 62. Thus, in the blanking mixer 62, the sampling pulse signals $P_1$ through $P_4$ and the blanking pulse Pb are mixed to form the sampling pulse $P_1$ through $P_4$ wherein the blanking pulse Pb is inserted as indicated in FIG. 10(B) through FIG. 10(E). The sampling pulses $P_1$ through $P_4$ thus obtained are respectively supplied from terminals 64a through 64d to the sampling hold circuits 32a through 32d.

A concrete circuit diagram of a part of a blanking mixer 62 is indicated in FIG. 12B. The blanking pulse introduced through the terminal 63 is supplied by way of an inverter 65 to a NAND circuit 66. The sampling pulse $P_1$ (polarity thereof being reversed from that of the pulse indicated in FIG. 10(B)) introduced through a terminal 67 is also supplied to the NAND circuit 66. Accordingly, when the blanking pulse Pb is at high level, the output of the NAND circuit 66 assumes also high level. Therefore, the sampling pulse $P_1$ wherein the blanking pulses Pb have been inserted is derived from an output terminal 68.

Figure 13:
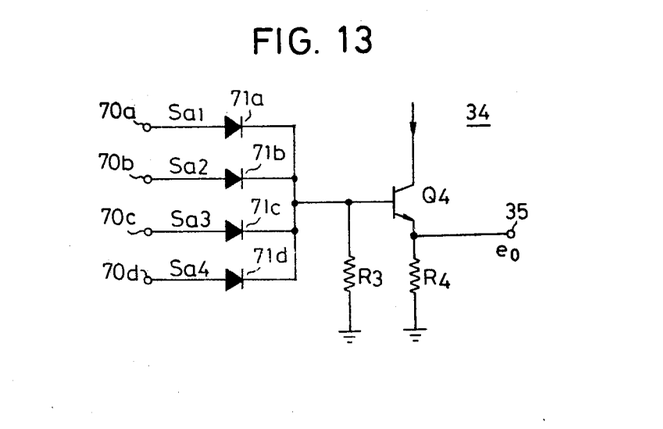
FIG. 13 is a circuit diagram showing one embodiment of a maximum value output circuit.

One embodiment of the maximum value output circuit 34 is indicated in FIG. 13. The output signals $Sa_1$ through $Sa_4$ of the sampling hold circuits 32a through 32d are respectively applied to terminals 70a through 70d, and then applied by way of diodes 71a through 71d connected in forward polarity direction to the base of a transistor $Q_4$. Accordingly, through the output terminal 35, there is emitted the maximum value of the signals $Sa_1$ through $Sa_2$.

While the above described embodiment is adapted to detect the maximum value of the signals $Sa_1$ through $Sa_4$, the modification may be made so as to detect the minimum value. This modification may be made by connecting the diodes 71a through 71d in reverse poled direction.

Further, this invention is not limited to these embodiments: variations and modifications may be made without departing from the scope of the invention.

What is claimed is:

1. A video signal processing circuit comprising: sampling pulse generating means for generating a plurality of pulse trains respectively having sampling pulses of a pulse width $\tau$ and a period T, said sampling pulses of respective pulse trains having different phases from each other so as not to overlap on a time axis; a plurality of sampling hold circuits, each of which is responsive to the sampling pulses of its corresponding pulse train and samples a common video signal supplied thereto and holds the sampled signal until the succeeding sampling pulse of the corresponding pulse train is applied thereto; maximum or minimum value output circuit means for deriving the maximum or minimum level from among the instantaneous output signals of the plurality of sampling hold circuits; subtraction circuit means for subtracting the video signal and the output signal of said maximum or minimum value output circuit means for each other; and means for clipping the output signal of said subtraction circuit means at a predetermined level to produce a binary video signal.

2. A video signal processing circuit as claimed in claim 1, wherein the period T of said sampling pulses is selected to be larger than a maximum pulse width of said binary video signal.

3. A video signal processing circuit as claimed in claim 2, wherein the period T of said sampling pulses is further selected to be smaller than three times the maximum pulse width of said binary video signal.

4. A video signal processing circuit as claimed in claim 1, further comprising blanking pulse generating means for generating a blanking pulse in correspondence to a blanking period of said video signal, and mixer means for mixing the blanking pulse with the sampling pulses of each of the plurality of pulse trains, each of said plurality of sampling hold circuits sampling the common video signal in response to the pulses of its corresponding pulse train mixed with the blanking pulse.

5. A video signal processing circuit as claimed in claim 4, wherein said sampling pulse generating means comprises oscillator means for generating a train of reference clock signals, and a shift register responsive to the train of reference clock signals for generating the plurality of pulse trains, said mixer means mixing the blanking pulse with the sampling pulses of the plurality of pulse trains from said shift register.

6. A video signal processing circuit as claimed in claim 5, wherein said mixer means comprises a plurality of NAND circuits, each having one input terminal to which the blanking pulse is supplied, the other input terminal of each NAND circuit having a corresponding pulse train supplied to it.

7. A video signal processing circuit as claimed in claim 1, wherein said maximum or minimum value output circuit means comprises a plurality of diodes, each having one electrode to which the output signal of its corresponding sampling hold circuit is supplied, the other electrode of each diode being connected to a common resistor to derive the maximum or minimum level from the junction between the common resistor and the other electrodes of the diodes.

8. A video signal processing circuit comprising: sampling pulse generating means for generating a plurality of pulse trains respectively having sampling pulses of a pulse width $\tau$ and a period T, said sampling pulses of respective pulse trains having different phases from each other so as not to overlap on a time axis; a plurality of sampling hold circuits, each of which is responsive to the sampling pulses of its corresponding pulse train and samples a common video signal supplied thereto and holds the sampled signal until the succeeding sampling pulse of the corresponding pulse train is applied thereto; and addition means for adding the output signals of said plurality of sampling hold circuits.

9. A video signal processing circuit as claimed in claim 8, further comprising blanking pulse generating means for generating a blanking pulse in correspondence to a blanking period of said video signal, mixer means for mixing the blanking pulse with the sampling pulses of the plurality of pulse trains, each of said plurality of sampling hold circuits sampling the common video signal in response to the pulses of its corresponding pulse train mixed with the blanking pulse.

10. A video signal processing circuit as claimed in claim 9, wherein said sampling pulse generating means comprises oscillator means for generating a train of reference clock signals, and a shift register responsive to the train of reference clock signals for generating the plurality of pulse trains, said mixer means mixing the blanking pulse with the sampling pulses of the plurality of pulse trains from said shift register.

11. A video signal processing circuit as claimed in claim 10, wherein said mixer means comprises a plurality of NAND circuits, each having one input terminal to which the blanking pulse is supplied, the other input terminal of each NAND circuit having a corresponding pulse train supplied to it.

* * * * *